United States Patent
Kim et al.

(10) Patent No.: US 7,865,209 B2
(45) Date of Patent: Jan. 4, 2011

(54) METHOD FOR CONTROLLING TRANSMISSION POWER OF A PHYSICAL RANDOM ACCESS CHANNEL

(75) Inventors: Noh-Sun Kim, Suwon-si (KR); Hee-Joon Chae, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1036 days.

(21) Appl. No.: 11/581,106

(22) Filed: Oct. 13, 2006

(65) Prior Publication Data

US 2007/0115872 A1 May 24, 2007

(30) Foreign Application Priority Data

Oct. 14, 2005 (KR) .................. 10-2005-0097152

(51) Int. Cl.
- H04B 7/00 (2006.01)
- H03C 1/62 (2006.01)
- H04W 72/00 (2009.01)

(52) U.S. Cl. ............... 455/522; 455/115.3; 455/452.2; 455/510

(58) Field of Classification Search ............ 370/320, 370/322, 329, 330, 332, 335, 336, 252, 337, 370/324, 344, 345, 347, 349, 350, 503, 512; 455/522, 510, 69, 70, 115.1, 115.3, 115.4, 455/434, 446–449, 452.2; 375/143, 149, 375/152

See application file for complete search history.

(56) References Cited

U.S. PATENT DOCUMENTS

| | | | | |
|---|---|---|---|---|
| 7,130,652 B2 * | 10/2006 | Raaf | ............ | 455/522 |
| 2003/0189949 A1 | 10/2003 | Belaiche | | |
| 2004/0029604 A1 * | 2/2004 | Raaf | ............ | 455/522 |
| 2004/0071194 A1 * | 4/2004 | Suwa et al. | ............ | 375/146 |
| 2004/0136354 A1 | 7/2004 | Li | | |
| 2005/0227721 A1 * | 10/2005 | Nakao | ............ | 455/510 |

FOREIGN PATENT DOCUMENTS

| | | |
|---|---|---|
| JP | 11-177445 | 2/1999 |
| KR | 100600775 | 6/2006 |
| KR | 1020060040948 | 11/2006 |

OTHER PUBLICATIONS

3GPP ETSI 125.214 V3.4.0 (Sep. 2000), Universal Mobile Telecommunications System (UMTS) Physical Layer Procedures (FDD) / 3GPP TS 25.214 Version 3.4.0 Release 1999.*

English language translation of KR 112005011672062, Mar. 2004, Korea, Chung, Hee Sok (H04B).*

* cited by examiner

Primary Examiner—Nick Corsaro
Assistant Examiner—Larry Sternbane
(74) Attorney, Agent, or Firm—The Farrell Law Firm, LLP

(57) ABSTRACT

A method for controlling transmission power of a physical random access channel in a mobile communication terminal. The mobile communication terminal sets initial transmission power according to received signal code power when a preamble of the physical random access channel is transmitted to a mobile communication network. A wireless channel environment is identified on the basis of a value of the received signal code power when the preamble must be retransmitted. According to the identified wireless channel environment, transmission power used in a previous preamble is variably increased and retransmission power is set.

4 Claims, 4 Drawing Sheets

METHOD FOR CONTROLLING TRANSMISSION POWER OF A PHYSICAL RANDOM ACCESS CHANNEL

PRIORITY

This application claims priority under 35 U.S.C. §119 to an application entitled "Method for Controlling Transmission Power of a Physical Random Access Channel" filed in the Korean Intellectual Property Office on Oct. 14, 2005 and assigned Serial No. 2005-97152, the contents of which are incorporated herein by reference.

BACKGROUND OF THE INVENTION

1. Field of the Invention

The present invention generally relates to a physical random access procedure of a mobile communication terminal, and more particularly to a method for controlling power at which a mobile communication terminal transmits a physical random access channel (PRACH) to a universal mobile telecommunication system (UMTS) terrestrial radio access network (UTRAN) in a UMTS system.

2. Description of the Related Art

A random access channel (RACH) for use in a universal mobile telecommunication system (UMTS) is an uplink (UL) random access channel for accessing a UMTS terrestrial radio access network (UTRAN) corresponding to a mobile communication network. The RACH is used to transmit a radio resource control (RRC) connection message for accessing the UTRAN when a terminal mainly receives a paging signal or attempts a call. Alternatively, the RACH is used to transmit a very small amount of data in a Cell_Forward Access Channel (Cell_FACH) state when the UTRAN is connected and a cell update message or UTRAN registration area (URA) update message is sent.

Because a physical random access procedure using a physical random access channel (PRACH) corresponding to a channel for transmitting the RACH is well known, a detailed description of the physical random access procedure is omitted here. An operation for transmitting a PRACH preamble and transmitting preamble detection information through an acquisition indication channel (AICH) in response to the transmitted PRACH preamble will be briefly described with reference to FIGS. 1 and 2. After transmitting a first preamble 200 of FIG. 2 to a UTRAN 102 through the PRACH in step 110 of FIG. 1, a user equipment (UE) 100 corresponding to a mobile communication terminal waits for the preamble detection information to be received from a Node B of the UTRAN 102. The UTRAN 102 includes the Node B and a radio network controller (RNC).

At this time, the UE 100 sets initial transmission power for transmitting a first PRACH preamble as shown in Equation (1).

$$\text{Preamble\_Initial\_Power} = \text{Primary CPICH } TX \text{ Power} - \text{CPICH\_}RSCP + UL \text{ Interference} + \text{Constant Value} \quad (1)$$

In Equation (1), Preamble_Initial_Power is an initial transmission power value, Primary CPICH TX Power is a transmission power value of a primary common pilot channel (CPICH), CPICH_RSCP is a received signal code power (RSCP) value of the CPICH, and UL Interference is a UL interference value.

Preamble_Initial_Power, Primary CPICH TX Power, CPICH_RSCP, and Constant Value are the values contained in system information transmitted from the UTRAN 102. The CPICH_RSCP value is measured in the UE 100.

After measuring the CPICH_RSCP value and obtaining the initial transmission power value using Equation (1), the UE 100 transmits the first PRACH preamble 200 to the Node B of the UTRAN 102 at the initial transmission power in step 110.

If the UE 100 does not receive preamble detection information from the Node B of the UTRAN 102 through the AICH until a predetermined time elapses, it increases the transmission power, used in a previous preamble, by a preset power ramping step, and then transmits a second preamble 202 at the increased transmission power.

If the UE 100 transmits the second preamble 202 but does not receive preamble detection information from the Node B of the UTRAN 102 through the AICH, it may retransmit a preamble up to a preset maximum number of retransmission times while increasing the transmission power by the power ramping step until the preamble detection information is received from the Node B of the UTRAN 102 through the AICH. That is, the UE 100 transmits a third preamble 204, . . . , an N-th preamble 206.

When the UE 100 transmits an n-th preamble, a transmission power value is computed as shown in Equation (2).

$$P(n) = \text{Preamble\_Initial\_Power} + \text{Power\_Ramping\_Step} \times (n-1) \quad (2)$$

In Equation (2), P(n) is the transmission power value when the n-th preamble is transmitted, Preamble_Initial_Power is an initial transmission power value obtained by Equation (1), Power_Ramping_Step is a power ramping step value, and n is the number of preamble transmissions. The n value is more than 1 and less than the maximum number of retransmissions. The maximum number of retransmissions is a value received from the UTRAN 102. The power ramping step value is received from the UTRAN 102 and is defined in a range from a minimum of 1 dB to a maximum of 8 dB in the current recommendation.

When the UE 100 does not receive an acknowledge (ACK) from the Node B of the UTRAN 102 or does not receive preamble detection information through the AICH even though preambles have been retransmitted to the maximum number of retransmissions, the UE 100 stops the random access procedure. The case where the UE 100 does not receive an ACK is the case where the UE 100 receives no reply or receives a negative acknowledge (NACK).

When detecting a preamble transmitted from the UE 100, the Node B of the UTRAN 102 transmits preamble detection information to the UE 100 through an AICH 208 in step 112. Upon receiving the preamble detection information, the UE 100 ends the physical random access procedure. When the physical random access procedure is completed, the UE 100 sends a PRACH message 210 to the UTRAN 102 in step 114.

Because a channel environment is better when the mobile communication terminal is located near the node or Node B, a measurement value of CPICH_RSCP is greater than that measured in a worse channel environment. In this case, the mobile communication terminal sets the initial transmission power value to a small value according to Equation (1). A probability in which the preamble detection information, i.e., an ACK, is received is low even when preambles corresponding to the maximum number of retransmissions are transmitted.

For example, the mobile communication terminal receives parameters from a mobile communication network as shown in Table 1 when considering system information received from the Voda network in Germany as of May 2005.

TABLE 1

| | |
|---|---|
| Primary CPICH TX Power | 29 dBm |
| UL Interference | −110 dBm |
| Constant Value | −27 dBm |
| Power_Ramping_Step | 3 dBm |
| Preamble_Retrans_Max | 8 |

Primary CPICH TX Power, UL Interference, and Constant Value of Table 1 are the same as those of Equation (1), and Power_Ramping_Step of Table 1 is the same as that of Equation (2). In Table 1, Preamble_Retrans_Max is the maximum number of retransmissions.

If CPICH_RSCP is −49 dBm when the mobile communication terminal is located near the node or Node B, an initial transmission power value obtained by Equation (1) is 29 dBm−(−49 dBm)+(−110 dBm)+(−27 dBm)=−59 dBm. The transmission power is −59 dBm+3 dBm×(8−1)=−38 dBm even when a preamble is transmitted 8 times corresponding to the maximum number of retransmissions of Preamble_Retrans_Max while the transmission power is increased by 3 dBm corresponding to Power_Ramping_Step.

According to simulation results, a call failure occurs when the mobile communication terminal does not receive an ACK from the Node B and fails to access the mobile communication network.

SUMMARY OF THE INVENTION

The present invention provides a method for controlling transmission power of a physical random access channel (PRACH) that can increase the probability of successful access of a mobile communication terminal.

Furthermore, the invention provides a method which adaptively controls the PRACH transmission power based on the wireless channel environment in which a mobile communication terminal operates.

The present invention, provides a method for controlling transmission power of a physical random access channel (PRACH) in a mobile communication terminal, the mobile communication terminal setting initial transmission power according to Common Pilot CHannel_Received Signal Code Power (CPICH_RSCP) when a preamble of the physical random access channel is transmitted to a mobile communication network, the method including: identifying a wireless channel environment on a basis of CPICH_RSCP when the preamble must be retransmitted; and variably increasing transmission power used in a previous preamble according to the identified wireless channel environment and setting retransmission power.

BRIEF DESCRIPTION OF THE DRAWINGS

The features and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, detailed descriptions of functions and configurations incorporated herein that are well known to those skilled in the art are omitted for clarity and conciseness.

Figure 3:
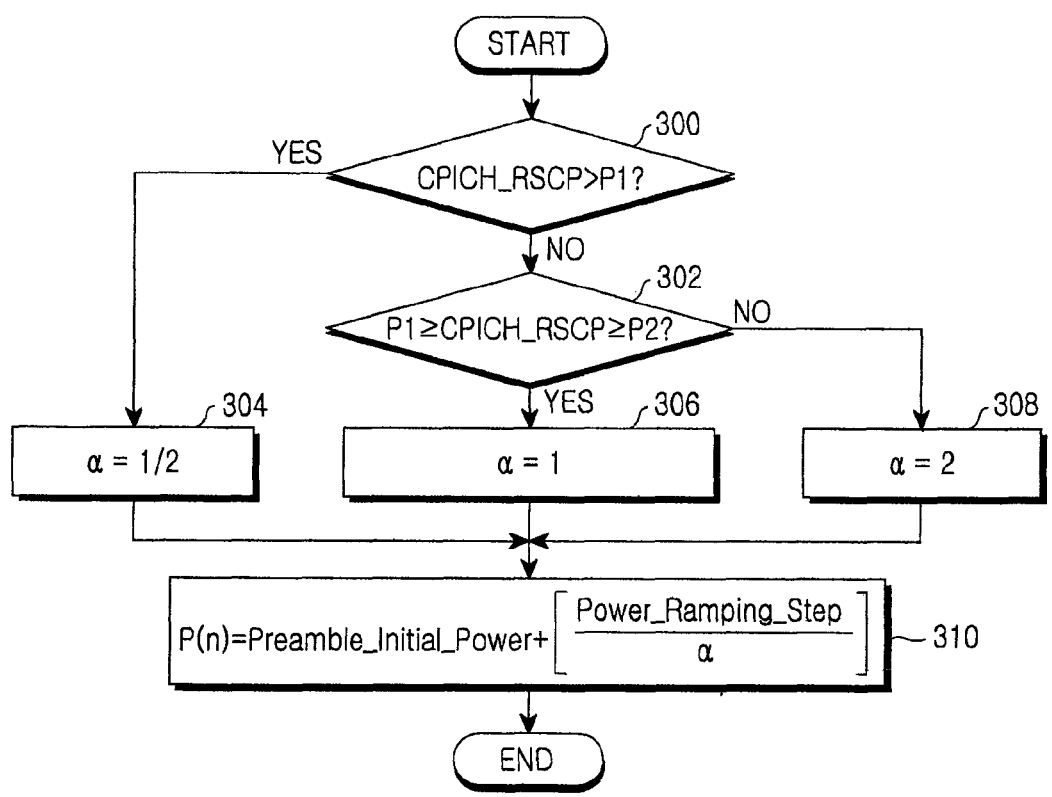
FIG. 3 is a flowchart illustrating an operation for controlling transmission power of a physical random access channel in accordance with the present invention.
Figure 4:
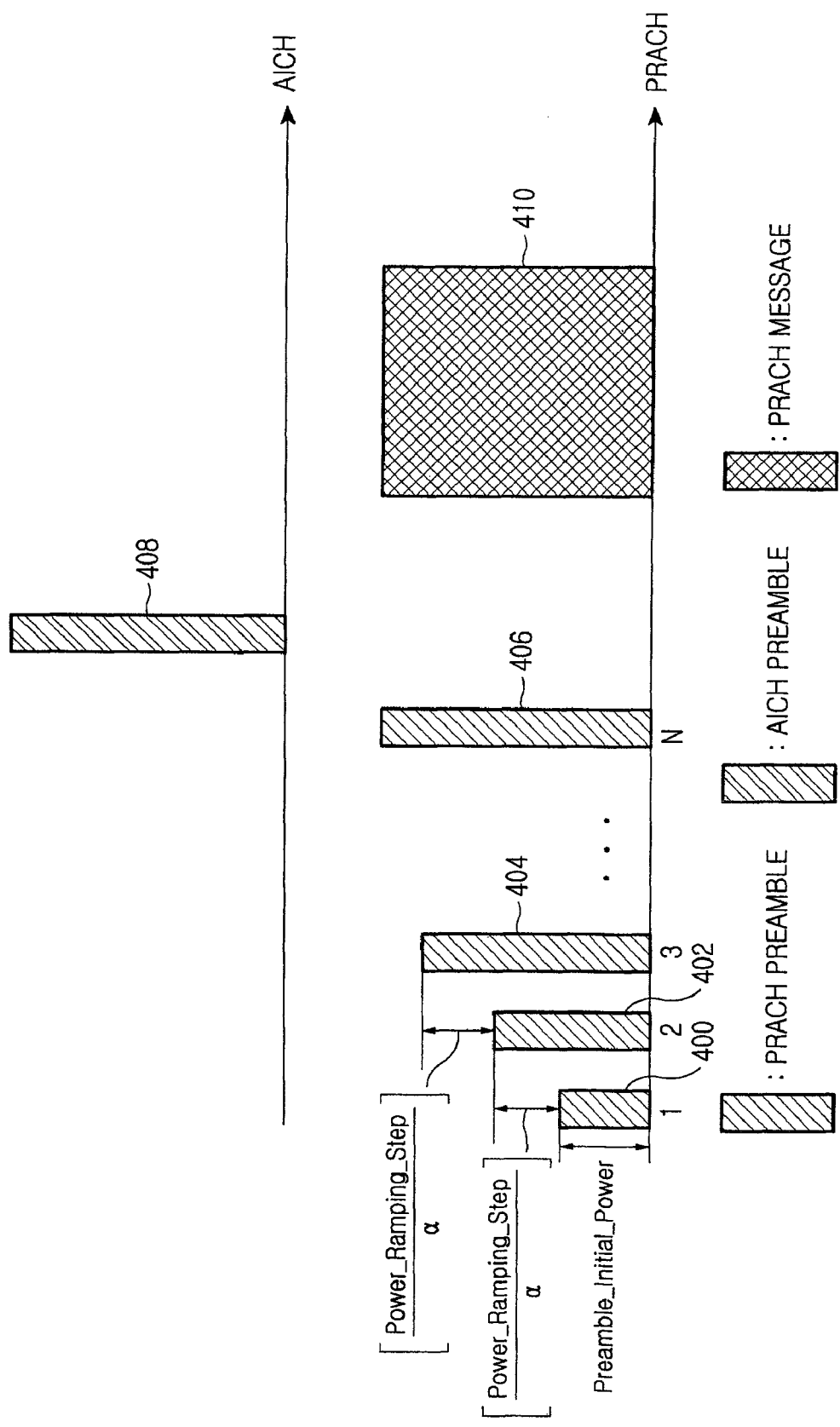
FIG. 4 illustrates transmission power ramping of the physical random access channel in accordance with the present invention.

FIG. 3 is a flowchart illustrating an operation for controlling transmission power of a physical random access channel (PRACH) in accordance with the present invention. and illustrates a transmission power setup process of steps 300 to 310 when a user equipment (UE) 100 must retransmit a PRACH preamble in a physical random access procedure. FIG. 4 illustrates transmission power ramping of the PRACH in accordance with the present invention.

Figure 1:
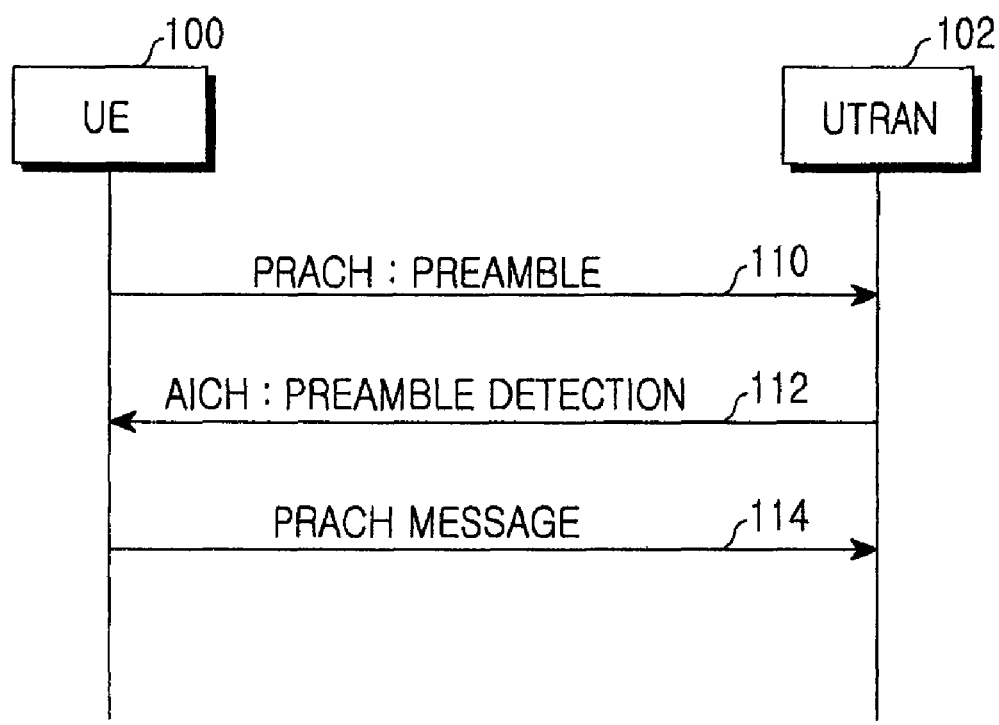
FIG. 1 schematically illustrates a physical random access procedure of a universal mobile telecommunication system (UMTS)
Figure 2:
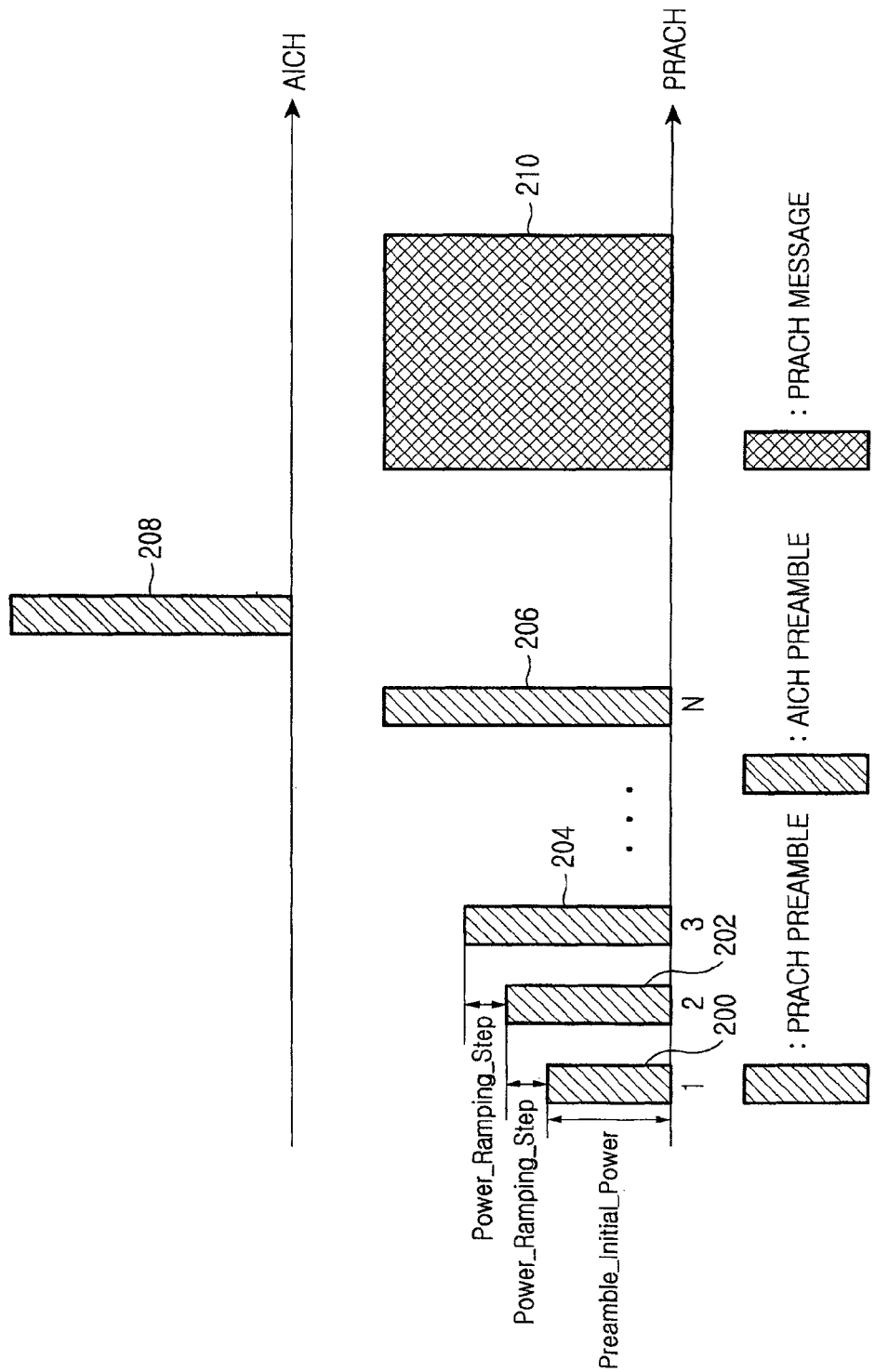
FIG. 2 illustrates transmission power ramping of a conventional physical random access channel.

The UE 100 transmits a first PRACH preamble 400 to a Node B of a universal mobile telecommunication system (UMTS) terrestrial radio access network (UTRAN) at initial transmission power in step 110 as described with reference to FIG. 1. If preamble detection information is not received from the Node B of the UTRAN 102 until a predetermined time elapses, the preamble is retransmitted.

At this time, the UE 100 identifies a wireless channel environment on the basis of CPICH_RSCP in steps 300 and 302. In response to the identified wireless channel environment, the UE 100 sets transmission power for retransmitting the preamble while variably increasing the transmission power, used in a previous preamble, according to Equation (3) in steps 304 to 310.

$$P(n) = \text{Preamble\_Initial\_Power} + \left[\text{Power\_Ramping\_Step} \times \frac{1}{\alpha}\right] \times (n-1) \quad (3)$$

In Equation (3), n is the number of preamble transmissions, P(n) is a transmission power value for transmitting an n-th preamble, Preamble_Initial_Power is an initial transmission power value, Power_Ramping_Step is a power ramping step, [Power_Ramping_Step×1/α] is a Gauss function, and α is a constant selected according to a result of comparing Common Pilot CHannel_Received Signal Code Power (CPICH_RSCP) with a preset reference range.

The reference range and α are optimized and set according to simulations. For example, α can be set according to CPICH_RSCP as shown in Table 2 when the reference range is P1≧CPICH_RSCP≧P2.

TABLE 2

| CPICH_RSCP | α |
|---|---|
| CPICH_RSCP > P1 | ½ |
| P1 ≧ CPICH_RSCP ≧ P2 | 1 |
| P2 > CPICH_RSCP | 2 |

First, the UE 100 determines if CPICH_RSCP is greater than the upper limit value P1 of the reference range or less than the lower limit value P2 of the reference range when CPICH_RSCP is not included in the reference range in steps 300 and 302. According to a determination result, the UE 100 identifies a wireless channel environment on the basis of CPICH_RSCP.

The UE 100 determines if CPICH_RSCP is greater than the upper limit value P1 of the reference range in step 300. If CPICH_RSCP is greater than the upper limit value P1 of the reference range, the UE 100 determines that the wireless channel environment is relatively good. The UE 100 sets α to ½ according to Table 2 in step 304 and then sets the transmission power according to Equation (3) in step 310. As a result, P(n) is set from the transmission power of a previous preamble to the transmission power increased by more than the power ramping step.

However, if CPICH_RSCP is less than the upper limit value P1 of the reference range as a determination result in step 300, the UE determines if CPICH_RSCP is in the reference range in step 302. If CPICH_RSCP is in the reference range, the UE 100 sets α to 1 according to Table 2 in step 306 and then sets the transmission power according to Equation (3) in step 310. As a result, P(n) is set from the transmission power of a previous preamble to the transmission power increased by the power ramping step.

Because CPICH_RSCP is less than the lower limit value P2 of the reference range if CPICH_RSCP is not included in the reference range as a determination result in step 302, the UE 100 determines that the wireless channel environment is relatively bad. The UE 100 sets α to 2 according to Table 2 in step 308 and then sets the transmission power according to Equation (3) in step 310. As a result, P(n) is set from the transmission power of a previous preamble to the transmission power increased by less than the power ramping step.

That is, the UE 100 increases the retransmission power P(n) by a relatively large value when CPICH_RSCP is relatively large, and increases the retransmission power P(n) by a relatively small value when CPICH_RSCP is relatively small.

This transmission power setup will now be described in more detail. When CPICH_RSCP is relatively large, an initial transmission power value is set to be relatively large according to Equation (1). Then, a probability in which preamble detection information is received from the Node B of the UTRAN 102 through an acquisition indication channel (AICH) becomes low with respect to the number of PRACH preamble transmissions. Accordingly, the UE 100 increases the probability in which the preamble detection information is received from the Node B of the UTRAN 102 through the AICH by increasing the retransmission power by more than the power ramping step. As a result, the UE 100 can increase the battery lifetime of a mobile communication terminal by reducing the number of unnecessary access times.

However, when CPICH_RSCP is relatively small, an initial transmission power value is set to be relatively small according to Equation (1). Then, a probability in which preamble detection information is received from the Node B of the UTRAN 102 through the AICH becomes high with respect to the number of PRACH preamble transmissions. Accordingly, the UE 100 increases the retransmission power by less than the power ramping step, thereby reducing the chance of having unnecessarily high transmission power to which may cause uplink interference.

The UE 100 transmits a second preamble 402 at the transmission power set as described above. If the UE 100 transmits the second preamble 402 but does not receive preamble detection information from the Node B of the UTRAN 102 through the AICH, it retransmits the preamble up to a preset maximum number of retransmission times while increasing the transmission power by [Power_Ramping_Step×1/α] until the preamble detection information is received from the Node B of the UTRAN 102 through the AICH. That is, the UE 100 transmits a third preamble 404, . . . , an N-th preamble 406.

If the Node B of the UTRAN 102 detects a preamble transmitted from the UE 100 and then transmits the preamble detection information to the UE 100 through the AICH 408, the UE 100 completes the physical random access procedure and then sends a PRACH message 410 to the UTRAN 102.

For reference, a ratio of the number of successful calls after the present invention is applied and the number of successful calls before the present invention is applied is shown in Table 3 according to simulation results.

TABLE 3

| Place | Number of successful calls/Number of call attempts (before application) | Number of successful calls/Number of call attempts (after application) |
| --- | --- | --- |
| A | 18/20 | 20/20 |
| B | 17/20 | 20/20 |
| C | 13/20 | 20/20 |
| Total | 48/60 | 60/60 |

As shown in Table 3, a call success probability before the present invention is applied is 80%, while a call success probability after the present invention is applied is 100%.

When a preamble must be retransmitted in a physical random access procedure of the present invention, the transmission power is adaptively increased according to a wireless channel environment of an associated user on the basis of CPICH_RSCP, such that the probability of successful access can be increased, the number of unnecessary access times can be reduced, and the battery lifetime of a mobile communication terminal can be increased. Moreover, the present invention can efficiently reduce uplink interference by preventing the transmission power from being unnecessarily increased.

An example in which the present invention is applied to a universal mobile telecommunication system (UMTS) has been described in the present invention. The present invention can be applied also in the case where a physical random access procedure is executed while increasing the transmission power according to a preset power ramping step.

An example in which α is changed in three steps according to CPICH_RSCP has been described. The reference range and the number of steps for changing α can be set to be large. An example in which α is set to ½, 1, and 2 has been described, but α can be set to a different value if needed.

Although preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for controlling transmission power of a physical random access channel in a mobile communication terminal, the mobile communication terminal setting an initial transmission power according to received signal code power when a preamble of the physical random access channel is transmitted to a mobile communication network, the method comprising the steps of:

identifying a wireless channel environment on a basis of a value of the received signal code power when the preamble must be retransmitted; and variably increasing transmission power used in a previous preamble according to the identified wireless channel environment, and setting retransmission power, wherein the setting step includes increasing the retransmission power by a value greater than a predefined power ramping step when the value of the received signal code power is greater than an upper limit value of a reference range, and increasing the retransmission power by a value less than the predefined power ramping step when the value of the received signal code power is less than the lower limit value of the reference range.

2. The method of claim 1, wherein the identifying step comprises:

comparing the value of the received signal code power with a predefined reference range, and wherein the setting step further comprises:

increasing the retransmission power by the power ramping step when the value of the received signal code power is in the reference range.

3. The method of claim 2, wherein the retransmission power is set by:

$$P(n) = \text{Preamble\_Initial\_Power} + \left[\text{Power\_Ramping\_Step} \times \frac{1}{\alpha}\right] \times (n-1),$$

where n is the number of preamble transmissions, P(n) is a transmission power value for transmitting an n-th preamble, Preamble_Initial_Power is a value of the initial transmission power, Power_Ramping_Step is the power ramping step, $$\left[\text{Power\_Ramping\_Step} \times \frac{1}{\alpha}\right]$$

is a Gauss function, and $\alpha$ is a constant selected according to a result of comparing the value of the received signal code power with the reference range.

4. The method of claim 3, wherein $\alpha$ is set to a value less than 1 when the value of the received signal code power is greater than the upper limit value of the reference range, wherein $\alpha$ is set to a value greater than 1 when the value of the received signal code power is less than the lower limit value, and wherein $\alpha$ is set to 1 when the value of the received signal code power is in the reference range.

* * * * *